(12) United States Patent
Moon et al.

(10) Patent No.: US 10,372,823 B1
(45) Date of Patent: Aug. 6, 2019

(54) NONLINEAR SEMANTIC SPACE BASED ON LEXICAL GRAPH

(71) Applicant: HRL Laboratories, LLC, Malibu, CA (US)

(72) Inventors: Hankyu Moon, Oak Park, CA (US); Rajan Bhattacharyya, Sherman Oaks, CA (US); James Benvenuto, Beverly Hills, CA (US)

(73) Assignee: HRL Laboratories, LLC, Malibu, CA (US)

( * ) Notice: Subject to any disclaimer, the term of this patent is extended or adjusted under 35 U.S.C. 154(b) by 47 days.

(21) Appl. No.: 15/331,424

(22) Filed: Oct. 21, 2016

Related U.S. Application Data

(60) Provisional application No. 62/245,863, filed on Oct. 23, 2015.

(51) Int. Cl.
*G06F 17/27* (2006.01)

(52) U.S. Cl.
CPC ........ *G06F 17/2785* (2013.01); *G06F 17/277* (2013.01); *G06F 17/2795* (2013.01)

(58) Field of Classification Search
CPC .......................... G06F 17/2785; G06F 17/2795
See application file for complete search history.

(56) References Cited

U.S. PATENT DOCUMENTS

| | | | | |
|---|---|---|---|---|
| 8,312,021 B2* | 11/2012 | Matveeva | ......... | G06F 17/30675 707/739 |
| 2004/0078144 A1* | 4/2004 | Cauwenberghs | ........ | G01V 1/28 702/14 |
| 2014/0067368 A1* | 3/2014 | Yih | ................... | G06F 17/30672 704/9 |
| 2015/0127650 A1* | 5/2015 | Carlsson | .......... | G06F 17/30011 707/737 |
| 2016/0098397 A1* | 4/2016 | Doherty | ............ | G06F 17/30011 707/769 |

OTHER PUBLICATIONS

S. Guo, Q. Wang, L. Wang, B. Wang, and L. Guo. Semantically smooth knowledge graph embedding. In Proceedings of ACL, 2015.*

Belkin, M. & Niyogi, P. (2001). Laplacian Eigenmaps and Spectral Techniques for Embedding and Clustering. NIPS, pp. 585-591.

Bradley, M. M. & Lang, P. J. (1999). Affective Norms for English Words (ANEW): Instruction Manual and Affective Ratings. Citeseer, pp. 1-49.

Deerwester, S. C., Dumais, S.T., Landauer, T. K., Furnas, G. W., & Harshman, R. A. (1990). Indexing by Latent Semantic Analysis. JASIS, 41(6), pp. 391-407.

(Continued)

*Primary Examiner* — Bryan S Blankenagel
(74) *Attorney, Agent, or Firm* — Tope-McKay & Associates

(57) ABSTRACT

Described is a system for generating a semantic space based on the lexical relations between words. The system determines synonym and antonym relations between a set of words. A lexical graph is generated based on the synonym and antonym relations. Manifold embedding of the lexical graph is determined, and Laplacian coordinates of the manifold embedding are assigned as semantic features of the set of words. A quantitative representation of the set of words is generated using the semantic features.

12 Claims, 13 Drawing Sheets

(56) References Cited

OTHER PUBLICATIONS

Dhillon, P., Foster. D. P., & Ungar, L. H. (2011). Multi-View Learning of Word Embeddings via Cca. Advances in Neural Information Processing Systems, pp. 199-207.

Finkelstein, L., Gabrilovich, E., Matias, Y., et al. (2001). Placing Search in Context: The Concept Revisited. Proceedings of the 10th International Conference on World Wide Web, pp. 406-414. ACM. http://www.cs.technion.ac.il/~gabr/resources/data/wordsim353/wordsim353.html. Downloaded on Dec. 12, 2016.

Hill, F., Cho, K. H., Jean, S., Devin, C., & Bengio, Y. (2014). Not All Neural Embeddings Are Born Equal. arXiv Preprint arXiv, 1410.0718, pp. 1-5.

Hill, F., Reichart, R., & Korhonen, A. (2014). Simlex-999: Evaluating Semantic Models with (genuine) Similarity Estimation. arXiv Preprint arXiv, 14083456, pp. 1-23.

Honkelaa, T., Hyvärinenb, A., & Väyrynena, J. (2005). Emergence of Linguistic Features: Independent Component Analysis of Contexts. Listener, 1(2), pp. 129-138.

Jutten, C. & Herault, J. (1991). Blind Separation of Sources, Part I: An Adaptive Algorithm Based on Neuromimetic Architecture. Signal Processing, 24(1), pp. 1-10.

Kolenda, T., Hansen, L. K., & Sigurdsson, S. (2000). Independent Components in Text Advances in Independent Component Analysis, pp. 235-256.

Kunegis, J., Schmidt, S., Lommatzsch, A., et al. (2010). Spectral Analysis of Signed Graphs for Clustering, Prediction and Visualization. SDM, pp. 1-12.

Lund, K. & Burgess, C. (1996). Producing High-Dimensional Semantic Spaces from Lexical Co-Occurrence. Behavior Research Methods, Instruments, & Computers, 28(2), pp. 203-208.

Rowels, S. T. & Saul, L. K. (2000). Nonlinear Dimensionality Reduction by Locally Linear Embedding. Science, 290(5500), pp. 2323-2326.

Samsonovic, A. V. & Ascoli, G, A. (2010). Principal Semantic Components of Language and the Measurement of Meaning. PloS One, 5(6), e10921-1-e10921-17.

J. B. Tenenbaum, V. de Silva, J. C. Langford. (2000). A Global Geometric Framework for Nonlinear Dimensionality Reduction, Science 290, pp. 2319-2323.

\* cited by examiner

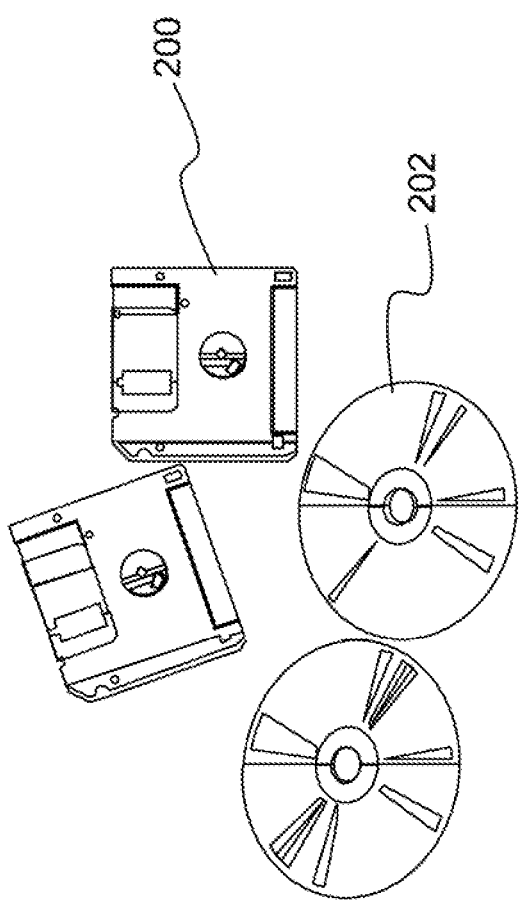

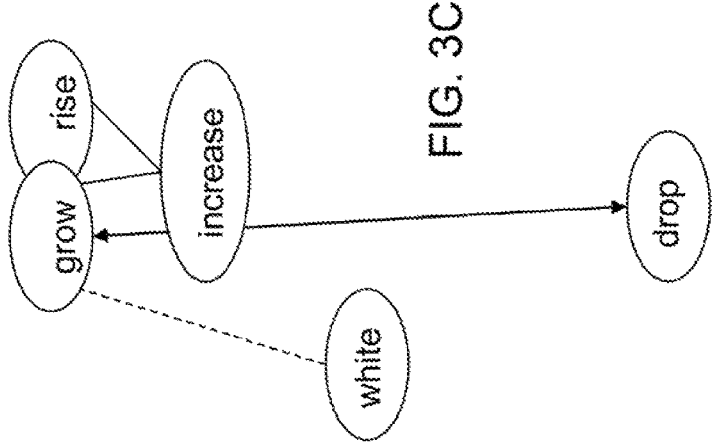
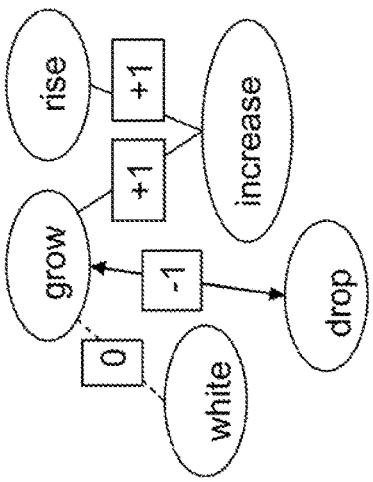
FIG. 3C
FIG. 3B
FIG. 3A

| cop-detective | television-tv |
| knife-sword | saved-won |
| Chinese-Japanese | detective-inspector |
| learn-teach | dad-papa |
| immediately-soon | prince-princess |
| heard-noticed | Christ-Jesus |

FIG. 5

| Semantic spaces | Laplacian | Laplacian-iCA | Row Similarity | LSA |
|---|---|---|---|---|
| WordSim-353 | 0.2594 | 0.2424 | 0.3908 | 0.4002 |
| SimLex-999 | 0.5699 | 0.5759 | 0.5727 | 0.1863 |

FIG. 7

NONLINEAR SEMANTIC SPACE BASED ON LEXICAL GRAPH

GOVERNMENT LICENSE RIGHTS

This invention was made with government support under U.S. Government Contract Number FA8650-13-C-7356. The government has certain rights in the invention.

CROSS-REFERENCE TO RELATED APPLICATIONS

This is a Non-Provisional application of U.S. Provisional Application No. 62/245,863, filed in the United States on Oct. 23, 2015, entitled, "Nonlinear Semantic Space Based on Lexical Graph," which is incorporated herein by reference in its entirety.

BACKGROUND OF INVENTION (1) Field of Invention

The present invention relates to a system for generating a real-valued semantic vector space representation of words and, more particularly, to a system for generating a real-valued semantic vector space representation such that lexical based relationships are preserved without mixing contextual or distributional similarities.

(2) Description of Related Art

Any system which deals with semantics must define a way to represent concepts and define a way to express relationships between concepts. Current computational approaches utilizing lexical semantics are usually ontological rather than vector space representation. For instance, lexical ontologies and the second distributional semantics are two methods for expressing relationships between concepts. The classic example of a lexical ontology is WordNet. This is a collection of over 155,000 words, including nouns, verbs, adjectives, and adverbs. The words are connected to other words by means of semantic relations, such as hypernyms, hyponyms, meronyms, holonyms, troponyms. The hypernym relationship organizes the nouns and verbs into hierarchies. WordNet was hand-built over many years. Like other hand-built lexical ontologies, WordNet contains errors, inconsistencies, and ad-hoc decisions affecting its structure. The strength of hand-built lexical ontologies is that they are consciously constructed to represent specific semantic relationships, which are highly interpretable. Their weakness is that they are constructed by hand and, consequently, contain errors, inconsistencies, and ad-hoc interpretations.

Other approaches to computational semantics that utilize manifold embedding, such as isomap and topic models, don't utilize lexical semantics, only distributional semantics. Distributional semantics are systems that are built automatically by analyzing very large corpora of text. In some cases, the corpora are general and, in others, domain specific. They are statistical in nature and work based on the assumption that semantic relationships can be derived by association with context. The so-called distributional hypothesis is "linguistic items with similar distributions have similar meanings". This distributional similarity can be operationalized in many different ways, such as latent semantic analysis, hyperspace analogue to language, isomap, random indexing, and various variants of topic models. These methods can be viewed as methods of dimensionality reduction, where a lower dimensional manifold is constructed that captures the data. The strengths of distributional semantic systems are that they can be built automatically and produce real-valued vectors to represent the semantics of words that then allow a wide range of mathematical machinery to be used on them, including many distance metrics and similarity measures. Their weakness is in their underlying assumption that context and distribution correlate with semantic meaning. This is only approximately true and, consequently, these methods require large copra. Also, there are many different dimensions of semantic relatedness that all get filtered through distributional similarity. Their other weakness is that, often, the resulting basis of the semantic vectors is semantically uninterpretable. Therefore, while the resulting vectors might have some correlation with "gross" semantic similarity, any distinction between "types" of semantic similarity and dimensions of the semantic vectors is completely unintelligible.

Thus, a continuing need exists for a system that generates a real-valued semantic vector space representation of words such that lexical based relationships are preserved without mixing distributional similarities.

SUMMARY OF INVENTION

The present invention relates to a system for generating a real-valued semantic vector space representation of words and, more particularly, to a system for generating a real-valued semantic vector space representation such that lexical based relationships are preserved without mixing contextual or distributional similarities. The system comprises one or more processors and a memory having instructions such that when the instructions are executed, the one or more processors perform multiple operations. The system determines synonym and antonym relations between a set of words. A lexical graph based on the synonym and antonym relations is generated. Manifold embedding of the lexical graph is determined, and Laplacian coordinates of the manifold embedding are assigned as semantic features of the set of words. A quantitative representation of the set of words is generated using the semantic features.

In another aspect, Laplacian eigenvectors of the lexical graph are determined as the manifold embedding, wherein the manifold embedding is Laplacian embedding.

In another aspect, principal components of the lexical graph are determined as the manifold embedding.

In another aspect, independent component analysis of the Laplacian embedding is applied.

In another aspect, the set of words is text derived from an input device.

In another aspect, the quantitative representation is used to decode brain activity.

As can be appreciated by one skilled in the art, in another aspect, the present invention also comprises a method for causing a processor to perform the operations described herein.

Finally, in another aspect, the present invention also comprises a computer program product comprising computer-readable instructions stored on a non-transitory computer-readable medium that are executable by a computer having a processor for causing the processor to perform the operations described herein.

BRIEF DESCRIPTION OF THE DRAWINGS

The objects, features and advantages of the present invention will be apparent from the following detailed descriptions of the various aspects of the invention in conjunction with reference to the following drawings, where:

FIG. 2 is an illustration of a computer program product according to various embodiments of the present disclosure;

FIG. 3A is an illustration of synonym-antonym relations between words according to various embodiments of the present disclosure;

FIG. 3B is an illustration of an adjacency graph according to various embodiments of the present disclosure;

FIG. 3C is an illustration of Laplacian embedding according to various embodiments of the present disclosure;

FIG. 5 is a table illustrating word pairs that are similar in Laplacian semantic space according to various embodiments of the present disclosure;

FIG. 7 is a table illustrating a comparison of human evaluated word similarity scores according to various embodiments of the present disclosure.

DETAILED DESCRIPTION

Figure 1:
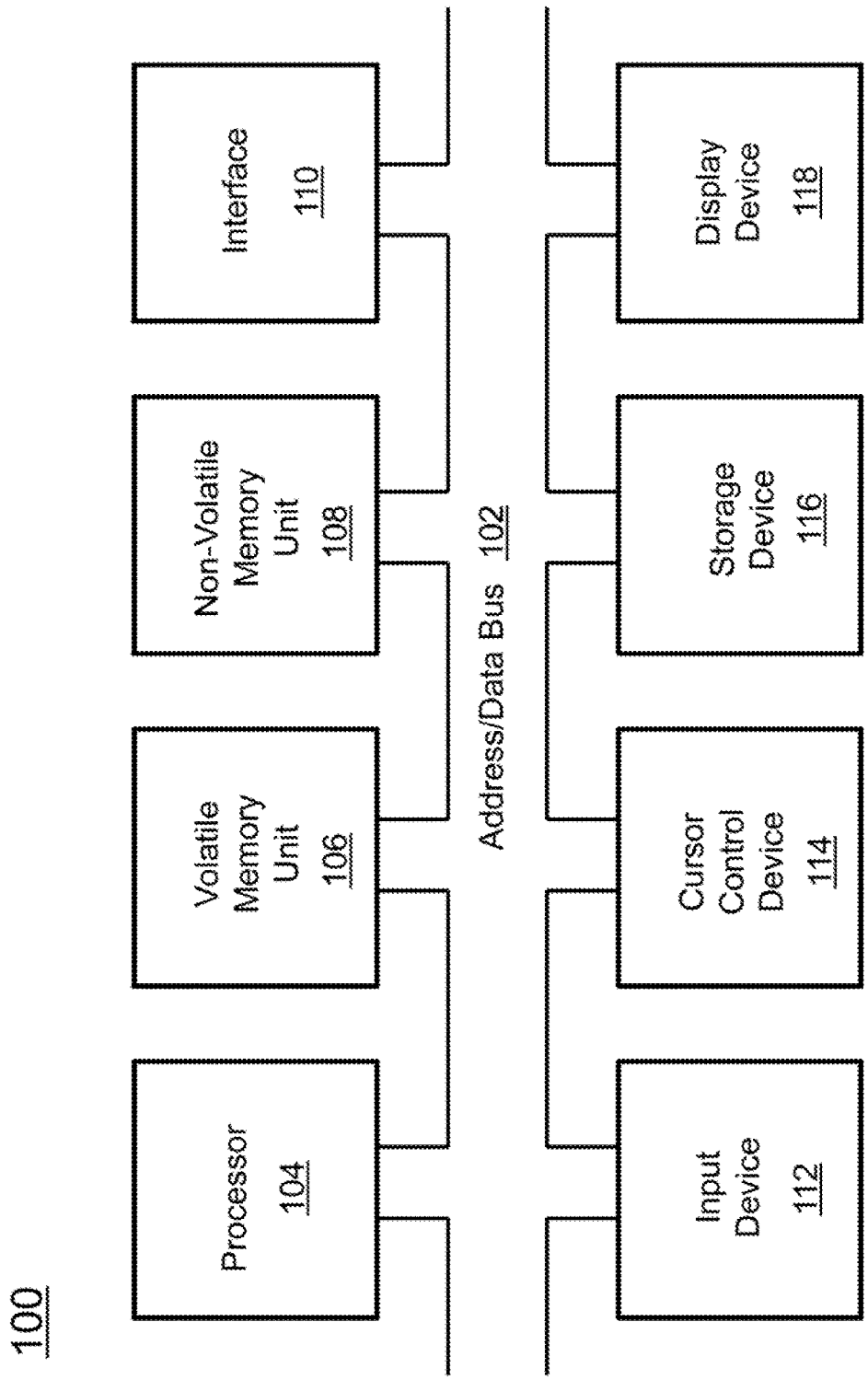
FIG. 1 is a block diagram depicting the components of a system for generating a real-valued semantic vector space representation of words according to various embodiments of the present disclosure.

The present invention relates to a system for generating a real-valued semantic vector space representation of words and, more particularly, to a system for generating a real-valued semantic vector space representation such that lexical based relationships are preserved without mixing contextual or distributional similarities.

The following description is presented to enable one of ordinary skill in the art to make and use the invention and to incorporate it in the context of particular applications. Various modifications, as well as a variety of uses in different applications will be readily apparent to those skilled in the art, and the general principles defined herein may be applied to a wide range of aspects. Thus, the present invention is not intended to be limited to the aspects presented, but is to be accorded the widest scope consistent with the principles and novel features disclosed herein.

In the following detailed description, numerous specific details are set forth in order to provide a more thorough understanding of the present invention. However, it will be apparent to one skilled in the art that the present invention may be practiced without necessarily being limited to these specific details. In other instances, well-known structures and devices are shown in block diagram form, rather than in detail, in order to avoid obscuring the present invention.

The reader's attention is directed to all papers and documents which are filed concurrently with this specification and which are open to public inspection with this specification, and the contents of all such papers and documents are incorporated herein by reference. All the features disclosed in this specification, (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

Furthermore, any element in a claim that does not explicitly state "means for" performing a specified function, or "step for" performing a specific function, is not to be interpreted as a "means" or "step" clause as specified in 35 U.S.C. Section 112, Paragraph 6. In particular, the use of "step of" or "act of" in the claims herein is not intended to invoke the provisions of 35 U.S.C. 112, Paragraph 6.

Before describing the invention in detail, first a list of cited references is provided. Next, a description of the various principal aspects of the present invention is provided. Subsequently, an introduction provides the reader with a general understanding of the present invention. Finally, specific details of various embodiment of the present invention are provided to give an understanding of the specific aspects.

(1) List of Cited Literature References

The following references are cited throughout this application. For clarity and convenience, the references are listed herein as a central resource for the reader. The following references are hereby incorporated by reference as though fully set forth herein. The references are cited in the application by referring to the corresponding literature reference number.

1. Belkin, M. & Niyogi, P. (2001). Laplacian Eigenmaps and Spectral Techniques for Embedding and Clustering. *NIPS*, 585-591.
2. Bradley, M. M. & Lang, P. J. (1999). Affective Norms for English Words (ANEW): Instruction Manual and Affective Ratings. Citeseer.
3. Deerwester, S. C., Dumais, S. T., Landauer, T. K., Furnas, G. W., & Harshman, R. A. (1990). Indexing by Latent Semantic Analysis. *JASIS*, 41(6), 391-407.
4. Dhillon, P., Foster. D. P., & Ungar, L. H. (2011). Multi-View Learning of Word Embeddings via Cca. *Advances in Neural Information Processing Systems*, 199-207.
5. Finkelstein, L., Gabrilovich, E., Matias, Y., et al. (2001). Placing Search in Context: The Concept Revisited. *Proceedings of the 10th International Conference on World Wide Web*, 406-414. ACM. http://www.cs.technion.ac.il/~gabr/resources/data/wordsim353/wordsim35 3.html.
6. Hill, F., Cho, K. H., Jean, S., Devin, C., & Bengio, Y. (2014). Not All Neural Embeddings Are Born Equal. *arXiv Preprint arXiv*, 1410.0718.
7. Hill, F., Reichart, R., & Korhonen, A. (2014). Simlex-999: Evaluating Semantic Models with (genuine) Similarity Estimation. *arXiv Preprint arXiv*, 1408.3456.
8. Honkelaa, T., Hyvarinenb, A., & Vayrynena, J. (2005). Emergence of Linguistic Features: Independent Component Analysis of Contexts. *Listener*, 1(2), 3.

9. Jutten, C. & Herault, J. (1991). Blind Separation of Sources, Part I: An Adaptive Algorithm Based on Neuromimetic Architecture. *Signal Processing*, 24(1), 1-10.
10. Kolenda, T., Hansen, L. K., & Sigurdsson, S. (2000). Independent Components in Text. *Advances in Independent Component Analysis*, 235-256.
11. Kunegis, J., Schmidt, S., Lommatzsch, A., et al. (2010). Spectral Analysis of Signed Graphs for Clustering, Prediction and Visualization. SDM, 559.
12. Lund, K. & Burgess, C. (1996). Producing High-Dimensional Semantic Spaces from Lexical Co-Occurrence. *Behavior Research Methods, Instruments, & Computers*, 28(2), 203-208.
13. Miller, G. & Fellbaum, C. (1998). *Wordnet: An Electronic Lexical Database*. MIT Press Cambridge.
14. Roweis, S. T. & Saul, L. K. (2000). Nonlinear Dimensionality Reduction by Locally Linear Embedding. *Science*, 290(5500), 2323-2326.
15. Samsonovic, A. V. & Ascoli, G, A. (2010). Principal Semantic Components of Language and the Measurement of Meaning. *PloS One*, 5(6), e10921.
16. J. B. Tenenbaum, V. de Silva, J. C. Langford. (2000). A Global Geometric Framework for Nonlinear Dimensionality Reduction, Science 290, 2319-2323.

(2) Principal Aspects

Various embodiments of the invention include three "principal" aspects. The first is a system for generating a real-valued semantic vector space representation of words. The system is typically in the form of a computer system operating software or in the form of a "hard-coded" instruction set. This system may be incorporated into a wide variety of devices that provide different functionalities. The second principal aspect is a method, typically in the form of software, operated using a data processing system (computer). The third principal aspect is a computer program product. The computer program product generally represents computer-readable instructions stored on a non-transitory computer-readable medium such as an optical storage device, e.g., a compact disc (CD) or digital versatile disc (DVD), or a magnetic storage device such as a floppy disk or magnetic tape. Other, non-limiting examples of computer-readable media include hard disks, read-only memory (ROM), and flash-type memories. These aspects will be described in more detail below.

A block diagram depicting an example of a system (i.e., computer system 100) of the present invention is provided in FIG. 1. The computer system 100 is configured to perform calculations, processes, operations, and/or functions associated with a program or algorithm. In one aspect, certain processes and steps discussed herein are realized as a series of instructions (e.g., software program) that reside within computer readable memory units and are executed by one or more processors of the computer system 100. When executed, the instructions cause the computer system 100 to perform specific actions and exhibit specific behavior, such as described herein.

The computer system 100 may include an address/data bus 102 that is configured to communicate information. Additionally, one or more data processing units, such as a processor 104 (or processors), are coupled with the address/data bus 102. The processor 104 is configured to process information and instructions. In an aspect, the processor 104 is a microprocessor. Alternatively, the processor 104 may be a different type of processor such as a parallel processor, application-specific integrated circuit (ASIC), programmable logic array (PLA), complex programmable logic device (CPLD), or a field programmable gate array (FPGA).

The computer system 100 is configured to utilize one or more data storage units. The computer system 100 may include a volatile memory unit 106 (e.g., random access memory ("RAM"), static RAM, dynamic RAM, etc.) coupled with the address/data bus 102, wherein a volatile memory unit 106 is configured to store information and instructions for the processor 104. The computer system 100 further may include a non-volatile memory unit 108 (e.g., read-only memory ("ROM"), programmable ROM ("PROM"), erasable programmable ROM ("EPROM"), electrically erasable programmable ROM "EEPROM"), flash memory, etc.) coupled with the address/data bus 102, wherein the non-volatile memory unit 108 is configured to store static information and instructions for the processor 104. Alternatively, the computer system 100 may execute instructions retrieved from an online data storage unit such as in "Cloud" computing. In an aspect, the computer system 100 also may include one or more interfaces, such as an interface 110, coupled with the address/data bus 102. The one or more interfaces are configured to enable the computer system 100 to interface with other electronic devices and computer systems. The communication interfaces implemented by the one or more interfaces may include wireline (e.g., serial cables, modems, network adaptors, etc.) and/or wireless (e.g., wireless modems, wireless network adaptors, etc.) communication technology.

In one aspect, the computer system 100 may include an input device 112 coupled with the address/data bus 102, wherein the input device 112 is configured to communicate information and command selections to the processor 100. In accordance with one aspect, the input device 112 is an alphanumeric input device, such as a keyboard, that may include alphanumeric and/or function keys. Alternatively, the input device 112 may be an input device other than an alphanumeric input device. In an aspect, the computer system 100 may include a cursor control device 114 coupled with the address/data bus 102, wherein the cursor control device 114 is configured to communicate user input information and/or command selections to the processor 100. In an aspect, the cursor control device 114 is implemented using a device such as a mouse, a track-ball, a track-pad, an optical tracking device, or a touch screen. The foregoing notwithstanding, in an aspect, the cursor control device 114 is directed and/or activated via input from the input device 112, such as in response to the use of special keys and key sequence commands associated with the input device 112. In an alternative aspect, the cursor control device 114 is configured to be directed or guided by voice commands.

In an aspect, the computer system 100 further may include one or more optional computer usable data storage devices, such as a storage device 116, coupled with the address/data bus 102. The storage device 116 is configured to store information and/or computer executable instructions. In one aspect, the storage device 116 is a storage device such as a magnetic or optical disk drive (e.g., hard disk drive ("HDD"), floppy diskette, compact disk read only memory ("CD-ROM"), digital versatile disk ("DVD")). Pursuant to one aspect, a display device 118 is coupled with the address/data bus 102, wherein the display device 118 is configured to display video and/or graphics. In an aspect, the display device 118 may include a cathode ray tube ("CRT"), liquid crystal display ("LCD"), field emission display ("FED"), plasma display, or any other display device suitable for displaying video and/or graphic images and alphanumeric characters recognizable to a user.

The computer system 100 presented herein is an example computing environment in accordance with an aspect. However, the non-limiting example of the computer system 100 is not strictly limited to being a computer system. For example, an aspect provides that the computer system 100 represents a type of data processing analysis that may be used in accordance with various aspects described herein. Moreover, other computing systems may also be implemented. Indeed, the spirit and scope of the present technology is not limited to any single data processing environment. Thus, in an aspect, one or more operations of various aspects of the present technology are controlled or implemented using computer-executable instructions, such as program modules, being executed by a computer. In one implementation, such program modules include routines, programs, objects, components and/or data structures that are configured to perform particular tasks or implement particular abstract data types. In addition, an aspect provides that one or more aspects of the present technology are implemented by utilizing one or more distributed computing environments, such as where tasks are performed by remote processing devices that are linked through a communications network, or such as where various program modules are located in both local and remote computer-storage media including memory-storage devices.

An illustrative diagram of a computer program product (i.e., storage device) embodying the present invention is depicted in FIG. 2. The computer program product is depicted as floppy disk 200 or an optical disk 202 such as a CD or DVD. However, as mentioned previously, the computer program product generally represents computer-readable instructions stored on any compatible non-transitory computer-readable medium. The term "instructions" as used with respect to this invention generally indicates a set of operations to be performed on a computer, and may represent pieces of a whole program or individual, separable, software modules. Non-limiting examples of "instruction" include computer program code (source or object code) and "hard-coded" electronics (i.e. computer operations coded into a computer chip). The "instruction" is stored on any non-transitory computer-readable medium, such as in the memory of a computer or on a floppy disk, a CD-ROM, and a flash drive. In either event, the instructions are encoded on a non-transitory computer-readable medium.

(3) Introduction

Described is a system to increase the fidelity with which the local semantic relationships exist between concepts or words. An advantage of the present invention is that these local semantic relationships can be preserved when transformed into a vector space that allows for ease of computation.

Any system which deals with semantics must define a way to represent concepts and define a way to express relationships between concepts. This involves a difficult decision—what are the features that compose the structure of concepts and how are they defined? One of the primary relationships between concepts is "similarity". A "ground truth" is often defined by using human rankings. This is a coarse measure, as concept similarity is multi-dimensional and highly context dependent.

Finding ways to express relationships between concepts is, in essence, a more fine-grained way to get at the notion of concept similarity. If concepts share a relationship with another concept, they have that as a similarity but can be completely unrelated with respect to some other relationship. Context bears on what relationships are relevant for similarity. This ability to represent relationships between concepts is represented by similarly named links between concepts in graph based representation schemes, and a similar value within one or a few dimensions in a vector space representation scheme.

All semantic information must have a corresponding syntactic structure that faithfully captures relevant semantic information. The relationships that exist between semantic concepts have to be expressible in syntactic forms that make reasoning over or processing the data tractable. There are two forms this expression can take: 1) graphs where the nodes represent the concepts and links represent relationships between the concepts; and 2) vector spaces where concepts are represented by points in space and distances between points represent degree of relationship between the concepts. Because a graph is a topographically unconstrained structure, it is very easy to make any number of links between concepts to represent different forms of relatedness. However, there is a difficulty in how to build and use such a structure. A vector space is a much more constrained topological structure, however, and it is much easier to "reason" over a vector space since there exists a large family of distance metrics and similarity relationships defined for it. The problem is having the local relationships that a graph easily supplies combined with the ease of computing that a vector space supplies.

As will be described in detail below, the system according to various embodiments of the present disclosure takes precise local lexical relationships between words/concepts and, using Laplacian embedding, places the words/concepts into a metrical vector valued space where the local relationships are approximately preserved and standard vector space operators can reason over the data expressed as locations.

Distributional semantics approaches, such as Latent Semantic Analysis (LSA) (see Literature Reference No. 3), Hyperspace Analogue to Language (HAL) (see Reference No. 12), and Eigenwords (see Reference No. 4) find low dimensional semantic representation from the statistics of word occurrences in natural texts. Despite their popularity, these methods do not differentiate lexical similarities (e.g., clever and smart) from contextual relations (e.g., doctor and hospital). They also do not differentiate opposite meanings (e.g., good and evil). Antonym pairs often appear close to each other in these distributional semantic spaces.

On the other hand, Literature Reference No. 15 introduced the statistical mechanical spin model for constructing a low-dimensional semantic space. Here, a spin model is optimized so that a synonym pair has the same spin direction and an antonym pair has the opposite spin direction. This approach is also free of context because the spin model is only constrained by lexical information. After optimization, the model reveals self-emergent semantic dimensions that closely match affective dimensions (see Literature Reference No. 2) of human behavior.

The system according to embodiments of the present disclosure is based on the same synonym/antonym relations to find a semantic space. Laplacian embedding is a popular data representation approach where pairwise similarity/dissimilarity is projected to a vector space. Effectively, this approach finds a linear coordinate system from the pairwise relations; this class of methods is often called graph embedding. It has beneficial properties of preserving nonlinear local distance and revealing hierarchical scale structure from the data similarity. Furthermore, the present invention offers two additional methods utilizing the lexical graph: (1) semantic features extracted from applying Independent Component Analysis to the Laplacian coordinates and (2) semantic features based on the rows of the graph and reducing their dimensionality using the Principal Component Analysis.

(4) Specific Details of Various Embodiments

Described is a system for generating a real-valued semantic vector space representation of words such that lexical based relationships (e.g., synonymy and antonymy) are preserved without mixing contextual or distributional similarities. Local non-linear relationships are preserved and hierarchical scale structure from data similarity is preserved. This allows for a more faithful vector space representation of words, relative to the selected local lexical relationships, than current methods. Precisely defined local and symbolic lexical relationships can be used to create a metrical space that is valuable for processing of semantic data such that those local relationships are preserved.

(4.1) Laplacian Embedding of the Graph

Laplacian embedding of a lexical graph reveals the very prominent local linear structure of words, where each linear semantic branch represents a different semantic concept with opposite meanings pushed apart. This is in contrast to distributional semantics where lexical and contextual similarities are mixed together. Independent Component Analysis was also applied, which produces sparse coordinates where each dimension clearly represents distinct semantic content. The constructed semantic spaces have highly desirable properties: (1) differentiated and precise lexical meanings, (2) identification of novel or missing word similarities, and (3) differentiated word senses.

Literature Reference No. 1 introduced a mathematically well-grounded method of computing a low-dimensional manifold representation of high-dimensional data. It is motivated by the relation between the discrete Laplacian, constructed from manifold distance, and the Laplace-Beltrami operator that corresponds to the manifold. The consequence of this relation is that the computed Laplacian eigenvectors provide a natural coordinate system for the manifold that preserves local distance in the original manifold.

The embedding can serve as a dimensionality reduction method when the graph can be constructed from a given feature space that the data reside in by selecting some number of lower eigen dimensions. It is one of many such approaches of geometric data representation, such as Locally Linear Embedding (LLE) (see Literature Reference No. 14), Isomap (see Literature Reference No. 16), and others, but with a firm mathematical footing. When the data points do not have vector space representation, but only pairwise relations, the method is quite powerful in that it provides natural coordinate system for the data points. This property is especially useful for the given problem of a finding coordinate system from pairwise lexical information (e.g., synonym or antonym), and there is no well-defined attributes for words. In fact, Belkin (see Literature Reference No. 1) introduced the embedding of words, based on their co-occurrence in natural texts, as the prime example of the method.

(4.1.1) Algorithm for Laplacian Embedding of Lexical Graph

The overall scheme of the method is illustrated in FIGS. 3A, 3B, and 3C.

1. From 164,203 words in Microsoft (MS) Thesaurus, select 16,643 words that are commonly used, based on the WordNet (see Literature Reference No. 13) frequency statistics.

2. Construct a graph adjacency matrix $A=\{a_{ij}\}_{i,j=1,\ldots,N}$ from the synonym-antonym relations:

$$a_{ij} = \begin{cases} 1, & \text{if } i \text{ and } j \text{ are synonyms} \\ -1, & \text{if } i \text{ and } j \text{ are antonyms} \\ 0, & \text{if no relation} \end{cases}$$

3. Compute the Laplacian L using both A and its degree matrix D:

$$L = D - A$$
$$D = \text{diag}(d_1, \ldots, d_N), \quad d_i = \sum_{j=1}^{N} a_{ij}$$

4. Compute the eigenvectors $x_1, \ldots, x_N$ corresponding to the eigenvalues $\mu_1 \leq \ldots \leq \mu_N$, such that $Lx = \mu_i x$.

5. The Laplacian coordinate of the k-th word is given by the k-th components of all of the computed eigenvectors according to the following:

$$\text{coord}(k) = (x_1^k, \ldots, x_M^k).$$

In a standard application of the Laplacian embedding method, it is assumed that all matrix elements of A are non-negative, which does not hold in the present case. The Laplacian for negative weight element of A is described in Literature Reference No. 11, where the sum of the absolute values of each row weights serves as its node degree. Additionally, the standard way of computing Laplacian eigenvectors is to find a vector x such that $Lx=\mu x$. The present invention adds an additional constraint of $x_i^T D x_i = 1$, which provides the embedding with normalized scaling. It can be enforced by solving a generalized eigenvalue problem $Lx=\mu_i Dx$, instead of the original problem in Step 4 above. It is also informative to note that for each I, the computed Laplacian eigenvectors satisfies the following optimization problem:

$$\text{Min}_i \frac{1}{2} x_i^T L x_i = \text{Min}_i \sum_{j,k=1}^{N} |a_{jk}|(x_i^j - \text{sign}(x_i^k))^2 =$$

$$\text{Min}_i \left\{ \sum_{i,j:\text{synonym}}^{N} (x_i^j - x_i^k)^2 + \sum_{i,j:\text{antonym}}^{N} (x_i^j + x_i^k)^2 \right\}.$$

The second equality holds because $a_{jk}=1$ for synonym pairs and $a_{jk}=-1$ for antonym pairs. This provides an immediate intuition of what the embedding achieves as it moves synonyms close together while taking antonyms apart at the same time as shown in FIGS. 3A-3C. FIG. 3A depicts a table of synonym-antonym relations between a set of words. In FIG. 3B, the synonym and antonym relations are converted to an adjacency graph. FIG. 3C illustrates the Laplacian embedding bringing synonyms (+1 weights) together and taking antonyms (−1 weights) apart.

(4.2) Independent Component Analysis

Independent Component Analysis (ICA) (see Literature Reference No. 9) is employed to reveal the 'hidden' semantic factors that supposedly underlie the vector space coordinates from the computed Laplacian Embedding. While the Laplacian coordinates provide semantic coordinate systems that linearize the local word-word distances, the ICA is capable of extracting out the semantic components that align with coordinate axes. In fact, ICA has been tested toward document analysis extraction of context features (see Literature Reference No. 8) and document classification (see Literature Reference No. 10) based on statistics of words in natural texts. The system according to various embodiments of the present disclosure differs from these prior trials in that it aims to extract semantic dimensions after linearizing word similarity relations.

Given the Laplacian coordinates $x_1, \ldots, x_M$ computed from the previous step, ICA extracts statistically independent basis vectors $s_1, \ldots, s_M$ and a M×M mixing matrix A such that:

$$\begin{pmatrix} x_1 \\ \ldots \\ x_M \end{pmatrix} = A \begin{pmatrix} s_1 \\ \ldots \\ s_M \end{pmatrix}.$$

Just as the eigenvectors $x_1, \ldots, x_M$ provide M-dimensional coordinates for 16,643 words (each $x_i=(x_i^1, \ldots, x_i^{16643})$), the ICA source vectors $s_1, \ldots, s_M$ (each $s_i=(s_i^1, \ldots, s_i^{16643})$) coordinates for 16,643 words.

(4.3) Lexical Graph Row Similarity

Lexical graph row similarity is a different approach to derive semantic features from the same lexical graph, which represents both lexical similarity and contextual similarities very well. The system described herein takes the rows of the graph as the semantic features, instead of using Laplacian eigenvectors. That is, it utilizes the i-th row of the lexical graph as the semantic features for the i-th word. This is based on the assumption that semantically similar words should have similar synonym/antonym relations to the rest of the words. For example, the words 'wonderful' and 'amazing' should have very similar synonym/antonym relations to other words. Due to the very high dimensionality (i.e., total number of words), Principal Component Analysis (PCA) is applied to extract lower dimensional features.

(4.3.1) Algorithm for Computing Lexical Graph Row Features

1. From 164,203 words in MS Thesaurus, select 16,643 words that are commonly used, based on the WordNet (see Literature Reference No. 13) frequency statistics.
2. Construct a graph adjacency matrix $A=\{a_{ij}\}_{i,j=1,\ldots,N}$ from the synonym-antonym relations:

$$a_{ij} = \begin{cases} 1, & \text{if } i \text{ and } j \text{ are synonyms} \\ -1, & \text{if } i \text{ and } j \text{ are antonyms} \\ 0, & \text{if no relation} \end{cases}$$

3. Compute the graph similarity matrix $B=\{b_{ij}\}_{i,j=1,\ldots,N}$, where $b_{ij}=a_i \cdot a_j/\|a_i\|\|a_j\|$ and $a_i$ is the i-th row of A: $a_i=(a_{i1}, \ldots, a_{iN})$.
4. Compute the eigenvectors (principal components) $x_1, \ldots, x_N$ corresponding to the eigenvalues $\mu_1 \leq \ldots \leq \mu_N$, of B such that $Bx=\mu_i x$.

The coordinate of the k-th word is given by the k-th components of all of the computed eigenvectors: $coord(k)=(x_1^k, \ldots, x_M^k)$.

(4.4) Experimental Studies

The Microsoft Word 2007 Thesaurus, a component in the commercially available Microsoft Office, Microsoft Office 2007 Professional for Windows, Microsoft Corporation, Redmond, Wash., USA, was used to derive synonymy and antonymy.

Figure 4A:
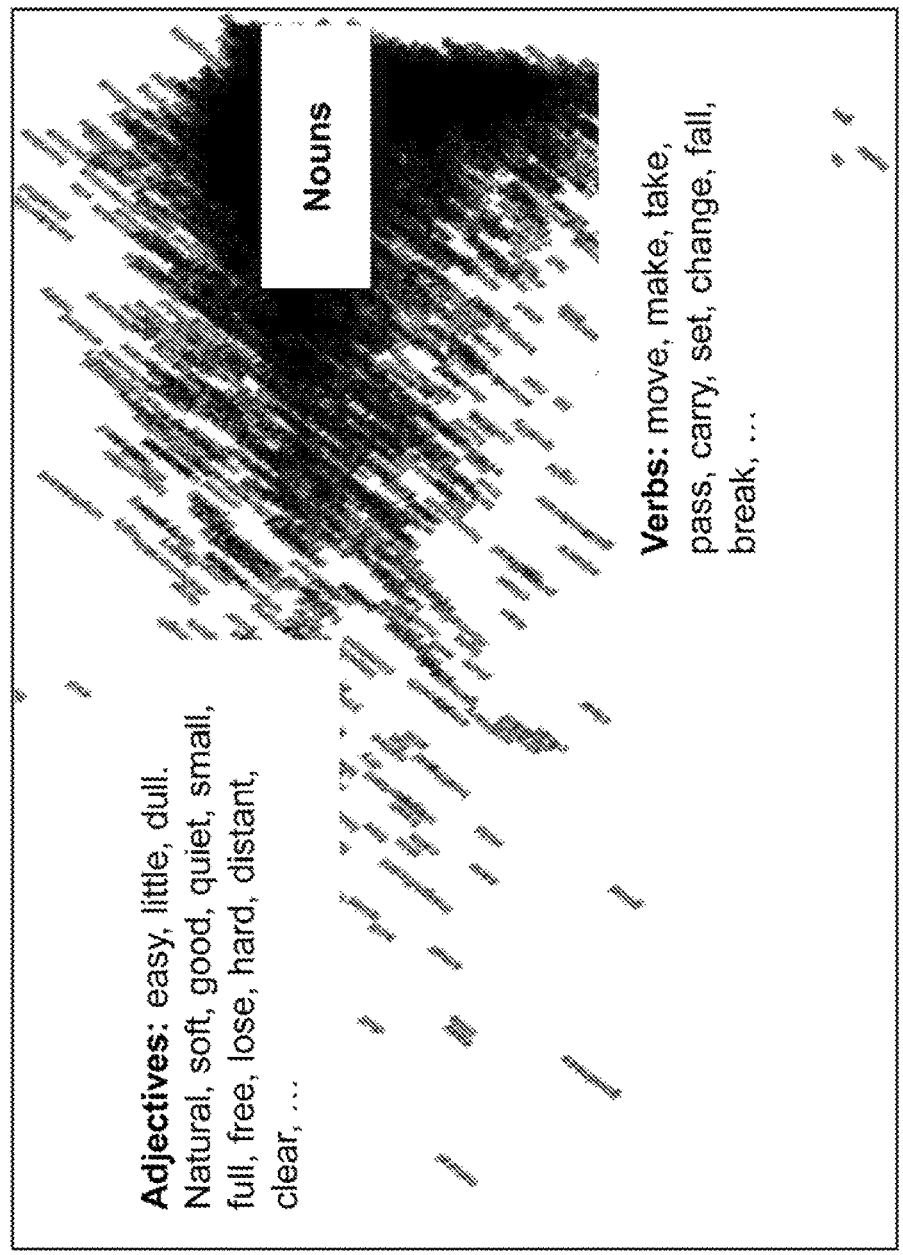
FIG. 4A is an illustration of Laplacian embedding projected to $1^{st}$-$2^{nd}$ eigenspaces according to various embodiments of the present disclosure.
Figure 4B:
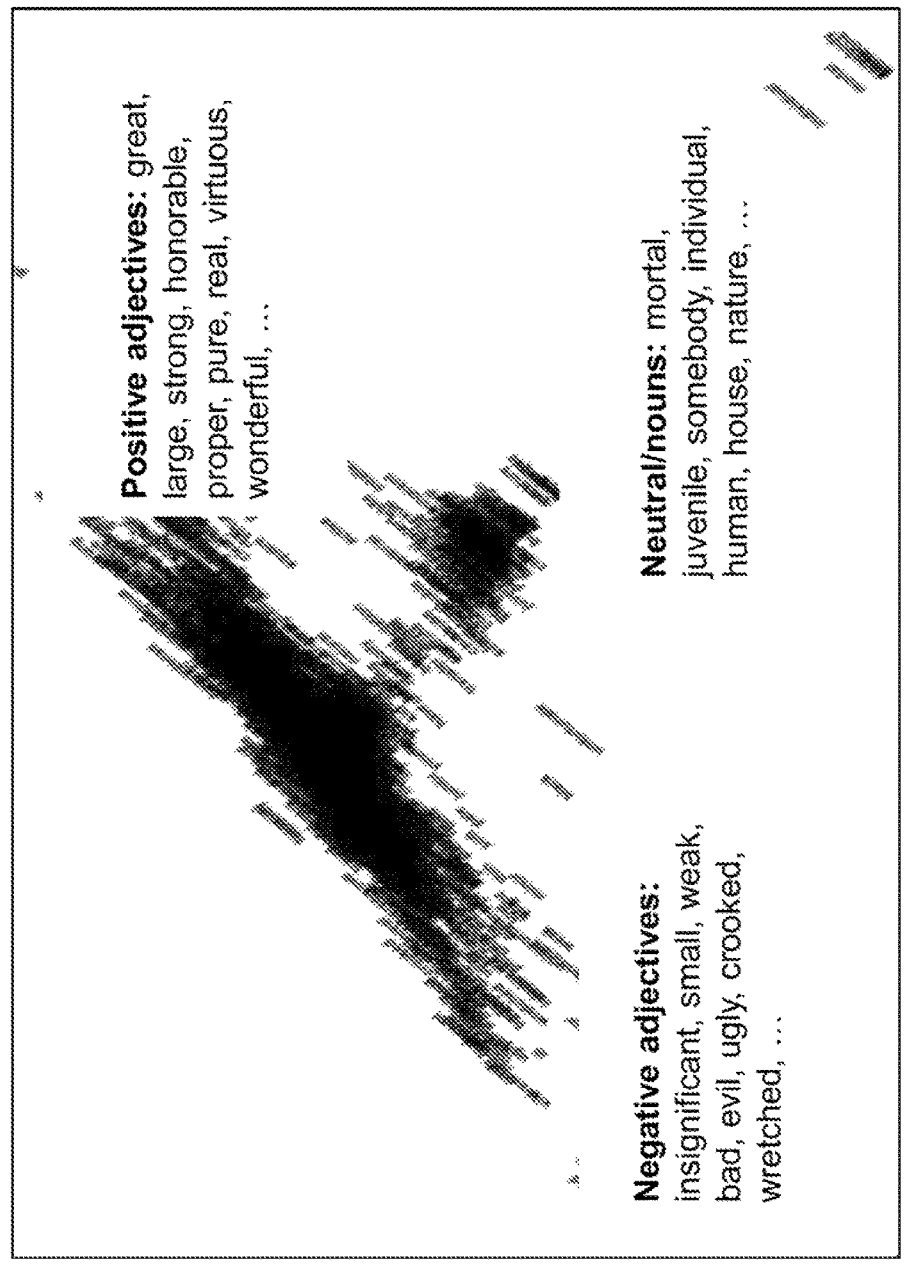
FIG. 4B is an illustration of Laplacian embedding projected to $3^{rd}$-$4^{th}$ eigenspaces according to various embodiments of the present disclosure.
Figure 4C:
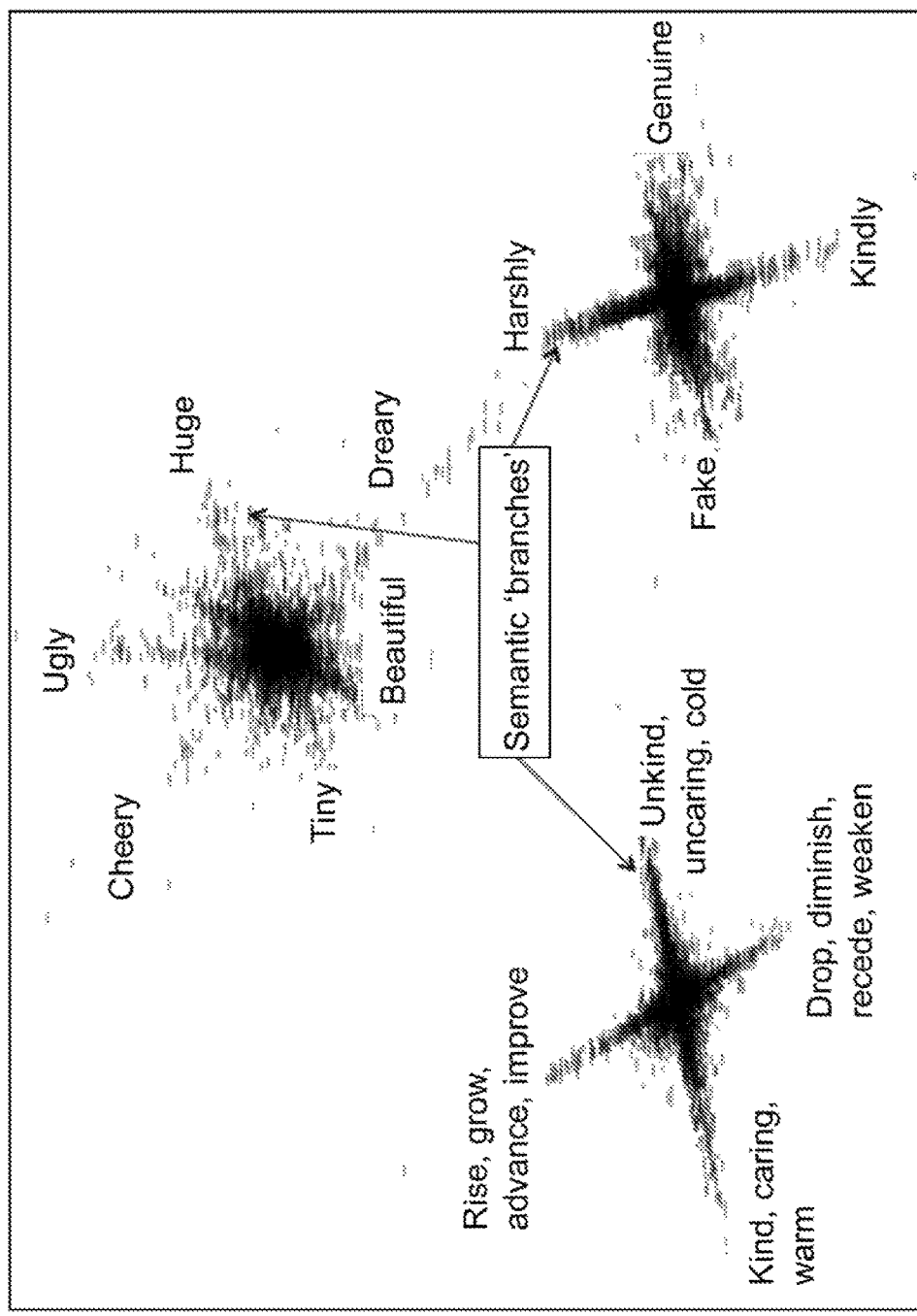
FIG. 4C is an illustration of Laplacian embedding projected to higher eigenspaces according to various embodiments of the present disclosure.

(4.4.1) Visualization of Words in Laplacian and Laplacian-ICA Coordinates (4.4.1.1) Laplacian-ICA Coordinates FIGS. 4A-4C show the computed word coordinates projected to the $1_{st}$-$2^{nd}$ (FIG. 4A), $3^{rd}$-$4^{th}$ (FIG. 4B) and higher eigenspaces (FIG. 4C). It was observed that the $1^{st}$-$2^{nd}$ projection separates the words with different parts of speech. The $3^{rd}$-$4^{th}$ projection places the words with positive meanings (e.g., great, large, strong, good) and words with negative meanings (e.g., insignificant, small, weak, evil) on the opposite sides from the origin. These reflect the suggested hierarchical property. For higher eigenspaces, it was observed that the embedding reveals very prominent local structures ('semantic branches') of words with clear separation of semantic contents. Each dimension represents one semantic concept with opposite meanings placed on opposite sides from the origin, such as rise-drop, warm-cold, and beautiful-ugly. The antonyms still reside in the same linear subspace. The property of local (i.e., semantic) distance preservation seems evident from these examples. The computed coordinates of the word corpus can readily serve as semantic features of words, because semantically similar words are close in the projections. It was observed that even higher dimensional subspaces (up to around $600^{th}$ dimension) show meaningful semantic structures. This is in contrast to Literature Reference No. 15, where only the first several dimensions contain meaningful semantic structures.

FIG. 5 is a table listing some of the word pairs that are close (in terms of cosine distance) in the Laplacian space, but not lexically related or missing from the thesaurus. This is an emergent property of the method according to embodiments of the present disclosure that discovers novel semantic relations from known lexical relations.

Figure 6A:
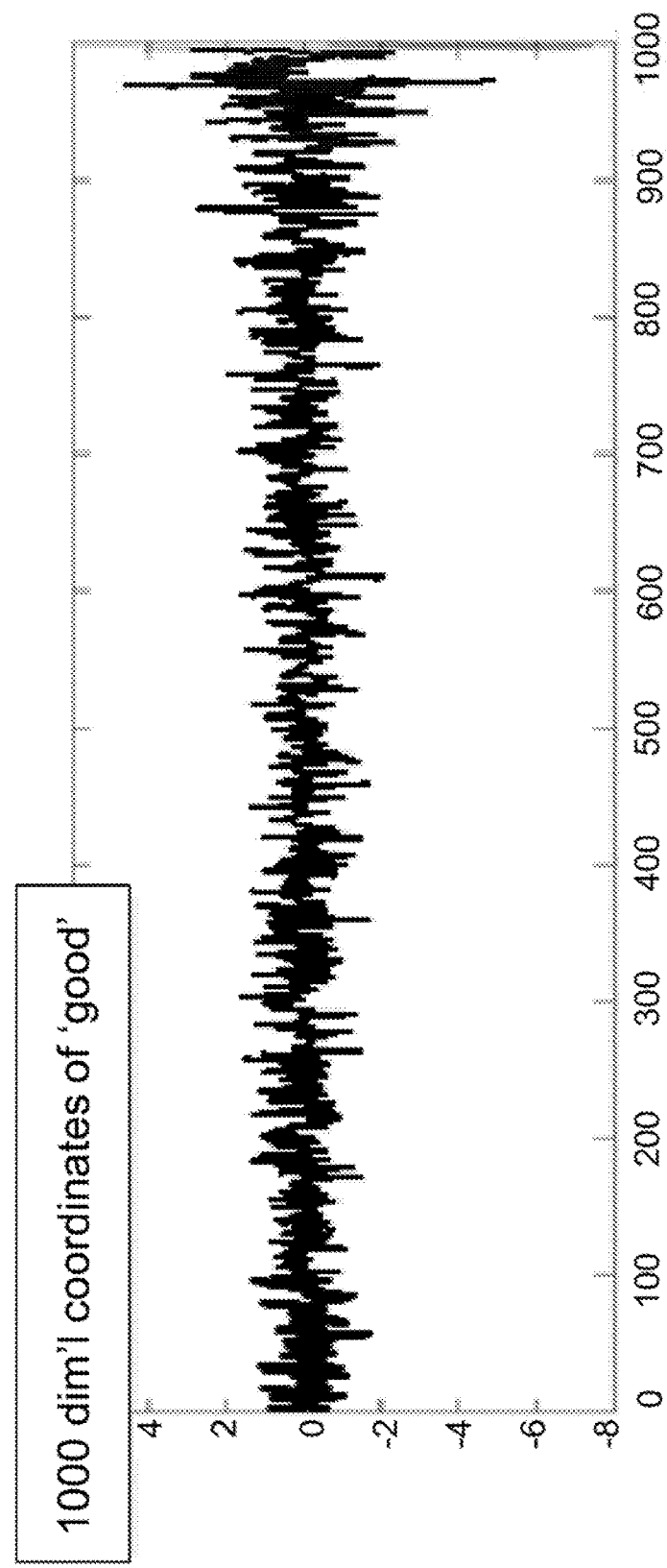
FIG. 6A illustrates the Laplacian coordinates of the word "good" according to various embodiments of the present disclosure.
Figure 6B:
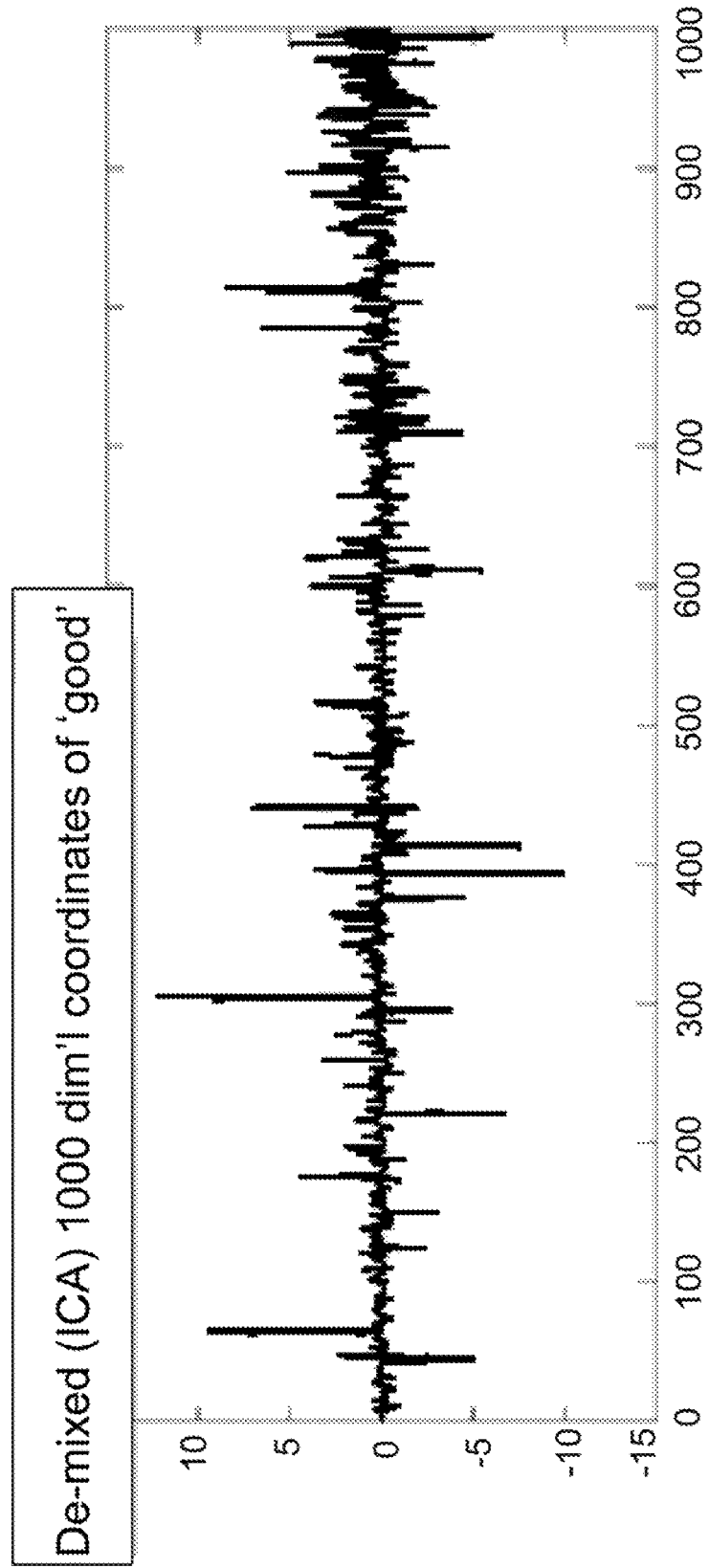
FIG. 6B illustrates the independent component analysis (ICA) coordinates of the word "good" according to various embodiments of the present disclosure.
Figure 6C:
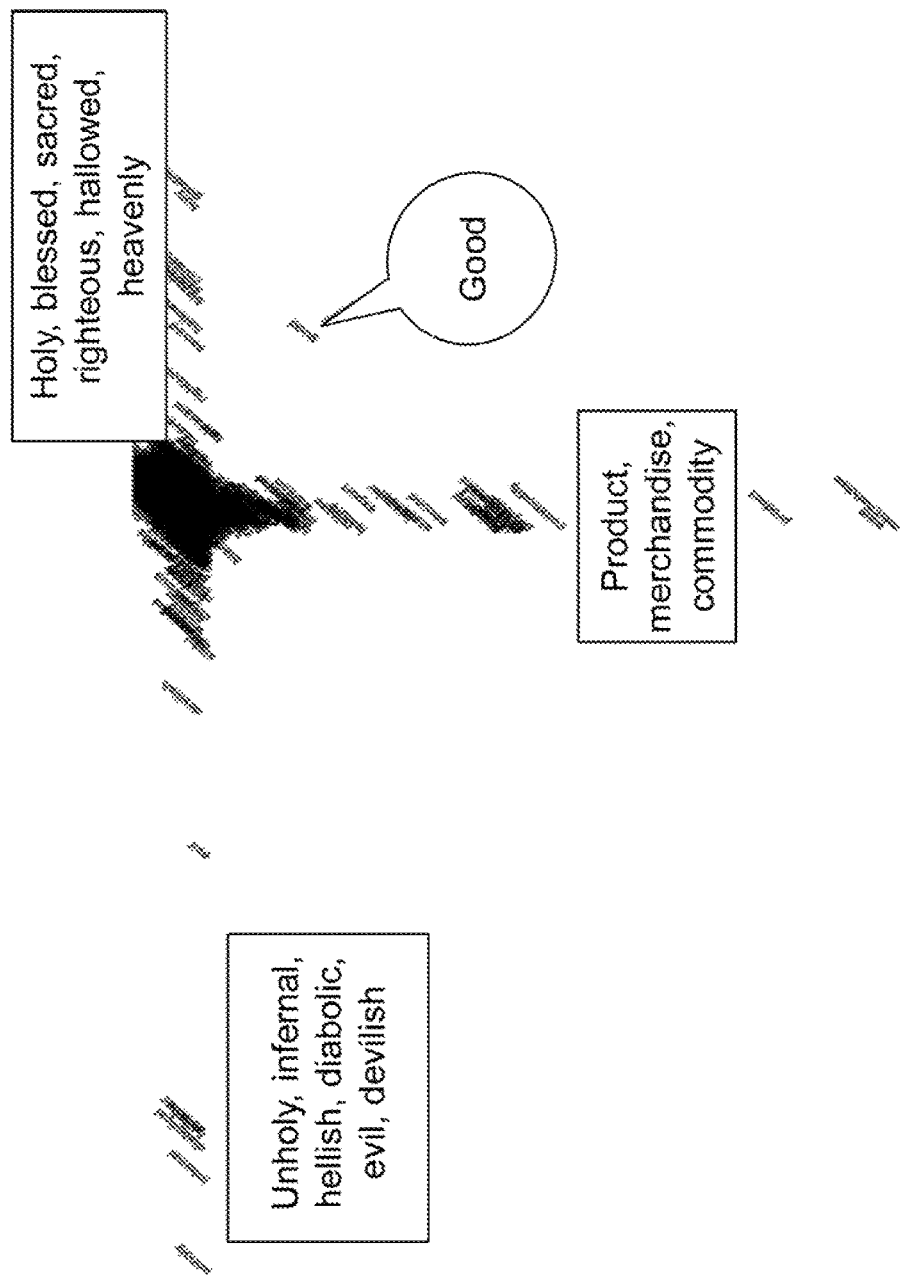
FIG. 6C illustrates the projection of words into the 2-subspace, where the word "good" has peaks according to various embodiments of the present disclosure.
Figure 6D:
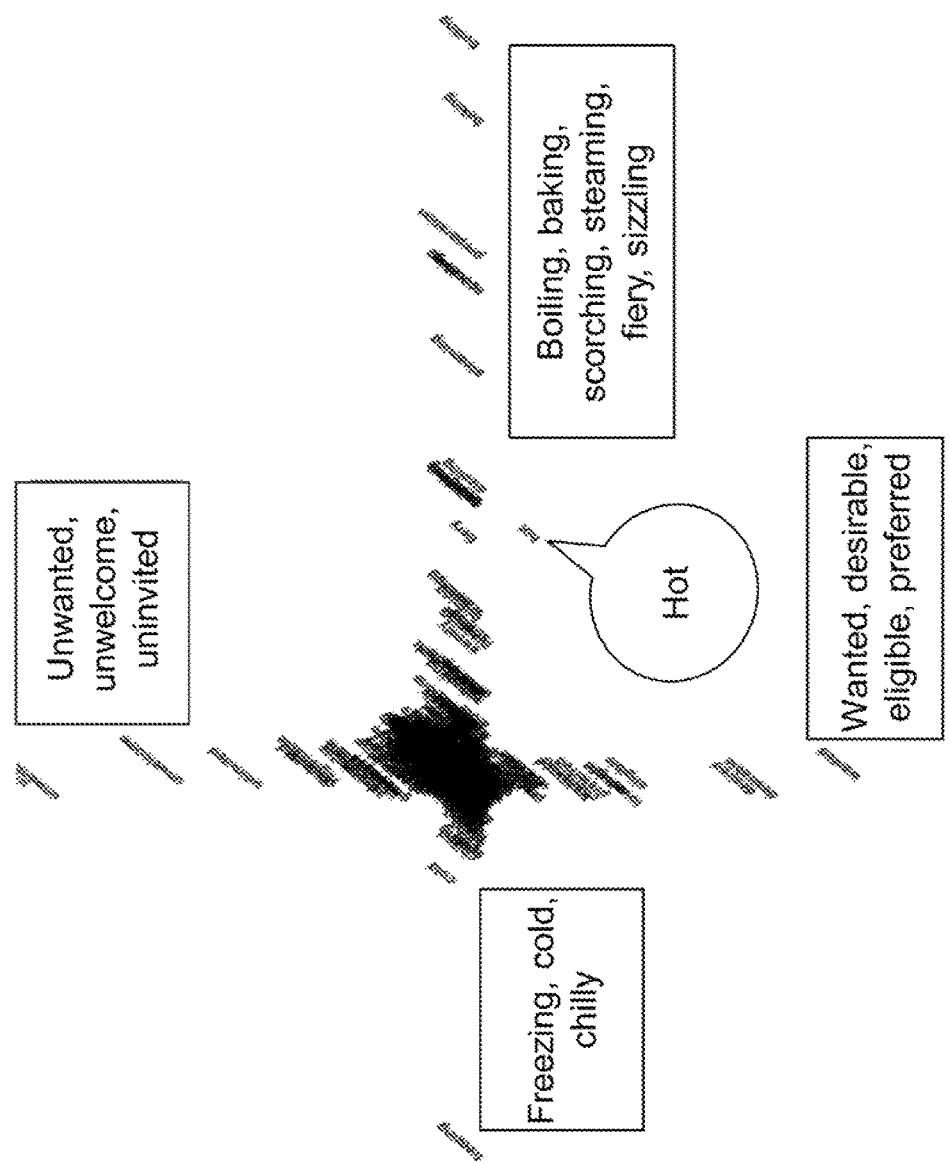
FIG. 6D illustration the projection of words into the 2-subspace, where the word "hot" has peaks according to various embodiments of the present disclosure.

FIG. 6B shows the computed ICA coordinates $(s_1^{5314}, \ldots, s_{1000}^{6314})$ from the Laplacian coordinates $(x_1^{6314}, \ldots, x_{1000}^{6314})$ (FIG. 6A) of the word 'good' that is the $6314^{th}$ word in the dictionary used. It is evident that the ICA coordinates are much sparser. Moreover, the Laplacian 'semantic branches' become aligned with coordinate axes, as shown in FIGS. 6C and 6D. The alignment provides a property of each ICA dimension representing a single semantic content. FIGS. 6A and 6B show the potential of the ICA coordinates for differentiating word senses. FIG. 6C shows the 2-dimensional subspace where the word 'good' has high coordinate values. These two dimensions happen to represent the two senses of 'good': (1) holy, sacred, etc. and (2) product, merchandize. Another example is shown in FIG. 6D for the word 'hot', where the two dimensions represent its two senses: (1) temperature and (2) desirability. A comprehensive quantitative study has not yet been conducted, but these early results show promises of the ICA coordinates toward word sense disambiguation.

(4.4.1.2) Word Similarity Tests

A quantitative evaluation was conducted to compare the Laplacian, Laplacian+ICA, Row Similarity features, and LSA features. The Simlex-999 (see Literature Reference No. 7) and WordSim-353 (see Literature Reference No. 5) human evaluated word similarity scores were used for the benchmarking. These benchmark data consist of pairs of words (353 for the WordSim-353 and 999 for the Simlex-999) with similarity scores judged by a human. The WordSim-353 data has 353 pairs of words, mostly nouns, while the SimLex-999 has 666 nouns, 111 adjectives, and 222 verbs. For example, both synonym pairs (e.g., journey-voyage, money-currency) and contextually related words (e.g., weather-forecast, stock-market) have high similarity scores. On the other hand, SimLex-999 data assigns high scores to synonyms and more closely related words (e.g., cow-cattle, hawk-bird) and low scores to antonyms or unrelated words (e.g., captor-tail, gun-fur).

The semantic spaces were benchmarked as follows. First, the similarity score of each word pair is the cosine similarity computed from the semantic coordinates of the words (Laplacian, Laplacian-ICA, Row Similarity, and LSA). Then the Spearman correlations are calculated between the vector of similarity scores (each vector from the four semantic spaces) and the human evaluated similarity scores (WordSim-353 or SimLex-999). The results are summarized in the table of FIG. 7. The lexical graph embeddings (Laplacian and Laplacian-ICA) did not do well in WordSim-353 benchmarking, while the context based semantic space (LSA) did better. The Laplacian and Laplacian-ICA did very well in SimLex-999, but LSA did poorly. On the other hand, the Row Similarity features achieved the best performance overall. Its SimLex-999 score was on par with Laplacian and Laplacian+ICA, and its WordSim-333 score was very close to that of LSA. The latter result is especially surprising because LSA contains contextual information by its construction, while the row similarity is constructed from purely lexical relations.

The derived continuous lexical space according to embodiments of the present disclosure can also be used to construct a semantic space where lexical relations and contextual relations are separated. An investigation can be performed to determine whether it is possible to construct a purely contextual space by eliminating the derived lexical similarities from the mixed distributional semantic similarities.

Figure 8:
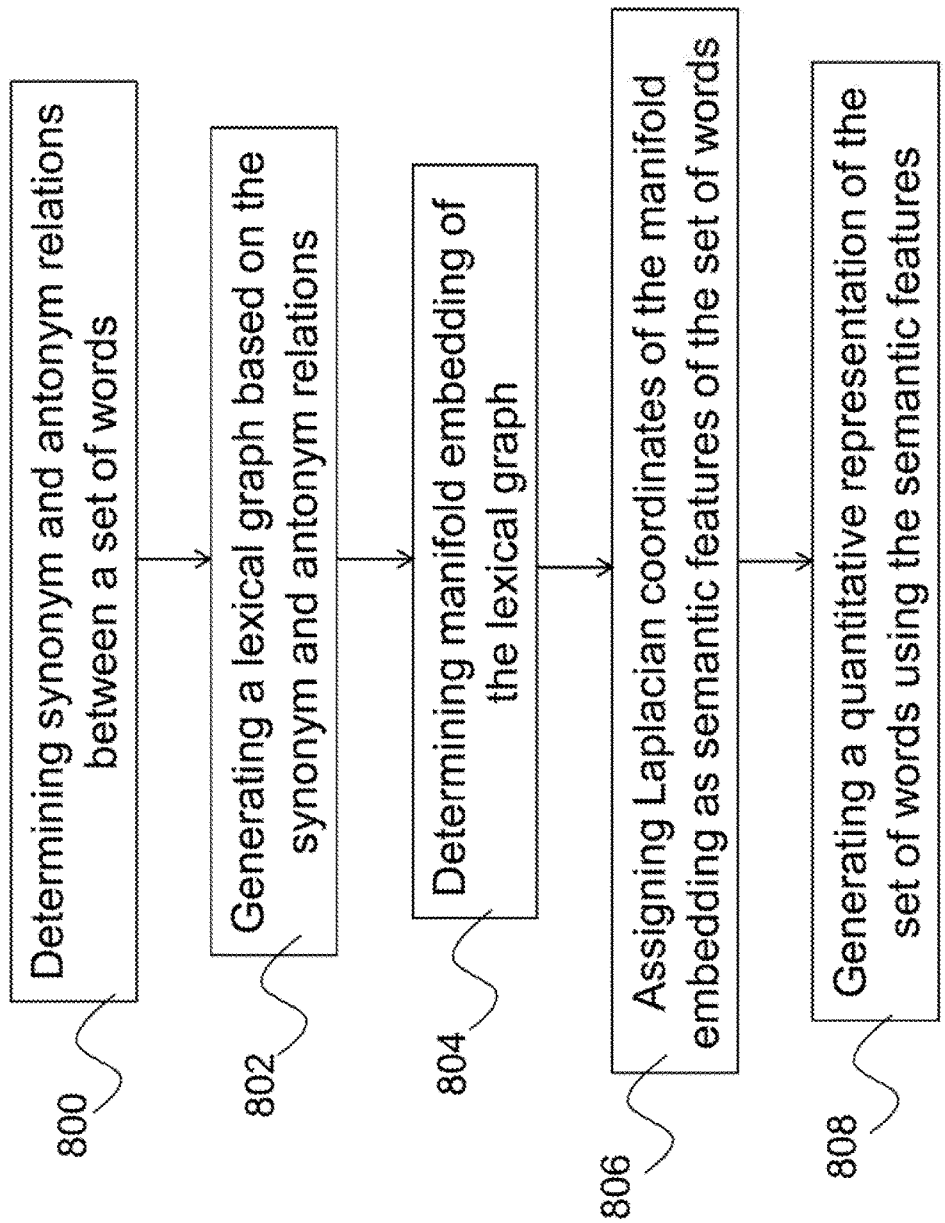
FIG. 8 is a flow diagram illustrating generating a semantic space based on the lexical relations between words according to various embodiments of the present disclosure.

FIG. 8 is a flow diagram illustrating generating a semantic space based on the lexical relations between words according to embodiments of the present disclosure. In a first operation 800, synonym and antonym relations are determined between a set of words. In a second operation 802, a lexical graph based on the synonym and antonym relations is generated. In a third operation 804, manifold embedding of the lexical graph is determined. In a fourth operation 806, Laplacian coordinates of the manifold embedding are assigned as semantic features of the set of words. In a fifth operation 808, a quantitative representation of the set of words is generated using the semantic features.

In summary, the present invention provides a unique application of Laplacian embedding of words related by local lexical properties. Systems where words and concepts need to be understood and reasoned will benefit from this invention. The system described herein supports any application that requires the processing of concepts and/or natural language by providing a new metrical semantic space. Commercial and owner applications include document analysis, human machine interfaces, and maintenance log analysis. For example, in maintenance logs present in data from customers, messages with text content providing descriptions can be transformed into the Laplacian embedding space to provide a new, quantitative representation of maintenance log information.

The applications involving human machine interfaces can include building smarter interfaces that understand the meaning and intent of users from text. The text can be derived from an input device, or from spoken speech and, hence, can apply to interfaces for vehicle and aircraft controls for vehicle manufacturers, or any other environment or device that can utilize text input, such as a command and control interface.

The present invention can also be used in applications where intent is not directly communicated by text, but by behavioral or neural signals. In particular, the system according to embodiments of the present disclosure creates a space which forms a ground truth structure with which to relate the neural activity patterns, such as found in functional magnetic resonance imaging blood-oxygen-level depending (fMRI BOLD), electroencephalogram (EEG), functional near-infrared spectroscopy (fNIRS), magnetoencephalography (MEG), and others to decode brain activity.

Finally, while this invention has been described in terms of several embodiments, one of ordinary skill in the art will readily recognize that the invention may have other applications in other environments. It should be noted that many embodiments and implementations are possible. Further, the following claims are in no way intended to limit the scope of the present invention to the specific embodiments described above. In addition, any recitation of "means for" is intended to evoke a means-plus-function reading of an element and a claim, whereas, any elements that do not specifically use the recitation "means for", are not intended to be read as means-plus-function elements, even if the claim otherwise includes the word "means". Further, while particular method steps have been recited in a particular order, the method steps may occur in any desired order and fall within the scope of the present invention.

What is claimed is:

1. A system for generating a semantic space based on the lexical relations between words, the system comprising:
   one or more processors and a non-transitory computer-readable medium having executable instructions encoded thereon such that when executed, the one or more processors perform operations of:
   determining synonym and antonym relations between a set of words;
   generating a lexical graph based on the synonym and antonym relations;
   determining Laplacian embedding of the lexical graph;
   assigning Laplacian coordinates of the Laplacian embedding;
   computing independent component analysis (ICA) coordinates from the Laplacian coordinates, resulting in semantic features for the set of words;
   generating a quantitative representation of the set of words using the semantic features; and
   using the quantitative representation, generating control commands for controlling a vehicle control element via a control interface of the vehicle control element.

2. The system as set forth in claim 1, wherein the one or more processors further perform an operation of determining Laplacian eigenvectors of the lexical graph as the Laplacian embedding.

3. The system as set forth in claim 1, wherein the one or more processors further perform an operation of determining principal components of the lexical graph as the Laplacian embedding.

4. The system as set forth in claim 1, wherein the set of words is text derived from an input device.

5. A computer implemented method for generating a semantic space based on the lexical relations between words, the method comprising an act of:
   causing one or more processors to execute instructions encoded on a non-transitory computer-readable medium, such that upon execution, the one or more processors perform operations of:
   determining synonym and antonym relations between a set of words;

generating a lexical graph based on the synonym and antonym relations;
determining Laplacian embedding of the lexical graph;
assigning Laplacian coordinates of the Laplacian embedding;
computing independent component analysis (ICA) coordinates from the Laplacian coordinates, resulting in semantic features for the set of words;
generating a quantitative representation of the set of words using the semantic features; and
using the quantitative representation, generating control commands for controlling a vehicle control element via a control interface of the vehicle control element.

6. The method as set forth in claim 5, wherein the one or more processors further perform an operation of determining Laplacian eigenvectors of the lexical graph as the Laplacian embedding.

7. The method as set forth in claim 5, wherein the one or more processors further perform an operation of determining principal components of the lexical graph as the Laplacian embedding.

8. The method as set forth in claim 5, wherein the set of words is text derived from an input device.

9. A computer program product for generating a semantic space based on the lexical relations between words, the computer program product comprising:
a non-transitory computer-readable medium having executable instructions encoded thereon, such that upon execution of the instructions by one or more processors, the one or more processors perform operations of:
determining synonym and antonym relations between a set of words;
generating a lexical graph based on the synonym and antonym relations;
determining Laplacian embedding of the lexical graph;
assigning Laplacian coordinates of the Laplacian embedding;
computing independent component analysis (ICA) coordinates from the Laplacian coordinates, resulting in semantic features for the set of words;
generating a quantitative representation of the set of words using the semantic features; and
using the quantitative representation, generating control commands for controlling a vehicle control element via a control interface of the vehicle control element.

10. The computer program product as set forth in 9, further comprising instructions for causing the one or more processors to further perform an operation of determining Laplacian eigenvectors of the lexical graph as the Laplacian embedding.

11. The computer program product as set forth in 9, further comprising instructions for causing the one or more processors to further perform an operation of determining principal components of the lexical graph as the Laplacian embedding.

12. The computer program product as set forth in claim 9, wherein the set of words is text derived from an input device.

* * * * *